Sept. 29, 1959        G. ROSSI        2,906,417
MATERIAL CONVEYING DEVICE
Filed Sept. 22, 1952        2 Sheets-Sheet 1
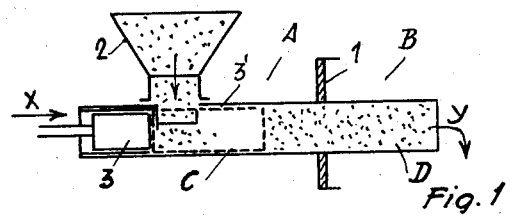
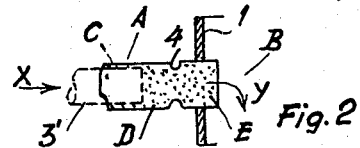
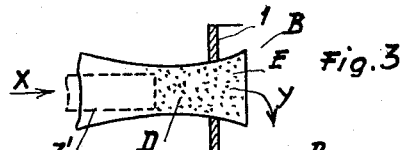
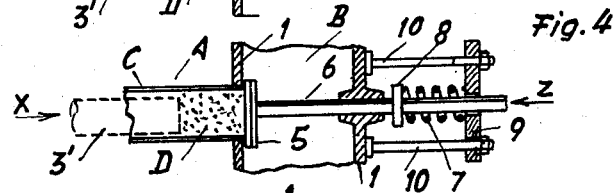
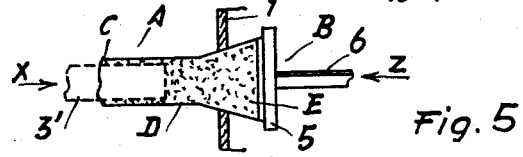
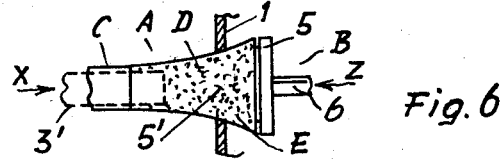
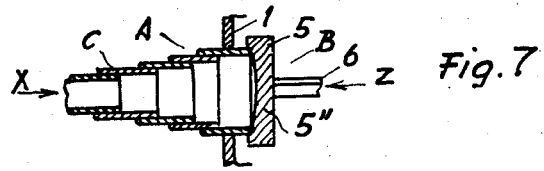

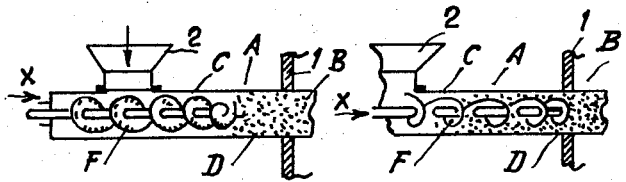
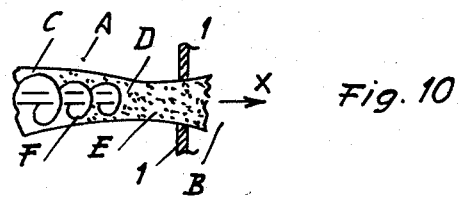
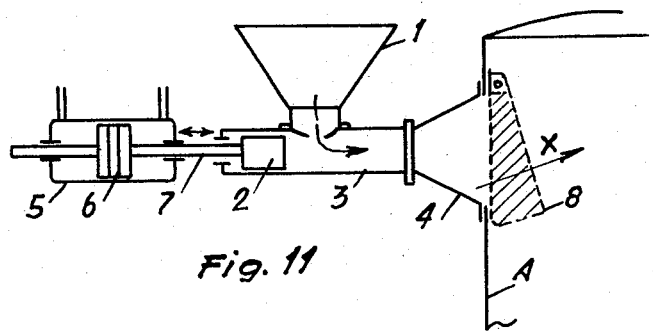
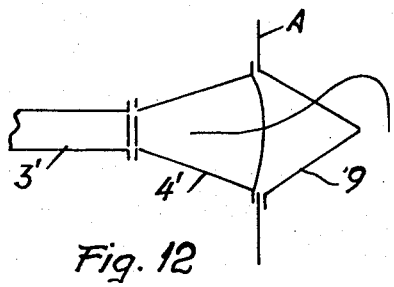

United States Patent Office 2,906,417
Patented Sept. 29, 1959

2,906,417
MATERIAL CONVEYING DEVICE

Giovanni Rossi, Milan, Italy

Application September 22, 1952, Serial No. 310,909

Claims priority, application Italy September 22, 1951

5 Claims. (Cl. 214—17)

The present invention relates to apparatus for the transport of small size and/or powdered materials between zones under different pressures.

Means are known for the mechanical introduction of small size materials into a container under pressure. Such means are normally not suitable when high temperatures and pressures are involved, when a perfect seal is indispensible, when there are corrosive acids and strongly abrasive materials involved, when it is necessary to reduce to a minimum the introduction of the air or of a liquid impregnating the material and so forth.

The apparatus according to the invention secures in a complete manner results not attained by known means, and offers particular advantage in the various applications.

According to the invention, material is pushed by means of feeding members into a conduit connecting two zones under different pressures. The dimensions and form of said conduit and of the feeding means being such as to create a zone of compressed material to close the conduit to the passage of media that might attempt to transfer itself from one zone to the other by the effect of the difference in pressure existing between the two zones.

According to the invention, the mechanism for feeding the material can be of the intermittent or discontinuous type in order to create an intermittent transfer of the material. In such a case, the discontinuity in the compression of the material will result in a plug which is moved intermittently along the conduit.

Some forms of apparatus are illustrated in the annexed drawing wherein:

Fig. 1 shows in longitudinal section a feeding apparatus of the discontinuous type with an alternating pusher.

Figs. 2 and 3 illustrate two variants, of a part of the structure illustrated in Fig. 1.

Figs. 4 to 7 are partial sectional views of a feeding device of the discontinuous type with auxiliary means operating against the action of a feeding member.

Figs. 8, 9 and 10 show, partially in section, three different forms of apparatus with a feeding member of the continuous type.

Figs. 11 and 12 show two further feed devices with a divergent conduit for the passage of the material.

In the figures of the drawing equivalent parts are, for clarity's sake, identified by the same reference characters.

The two zones under different pressures are generally indicated by A and B and are separated by a diaphragm 1. It is not important which of the two zones is at the lower pressure, whereas in all of the illustrated examples it is understood that the material passes from zone A to zone B, and therefore in the direction of arrow X.

The devices illustrated are therefore material charging or discharging means operating toward or away from containers under higher or lower pressures than the source.

In the example of Fig. 1, a finely divided or powdered material in zone A is contained in a hopper 2 that discharges by gravity into the horizontal constant section conduit C, which connects the two zones A and B. Said constant section conduit is of circular section and is traversed by a piston 3 having an axial movement and constituting the pushing mechanism for the intermittent feeding of the material. Piston 3, illustrated in one position of stroke end, in which it allows the charging of the conduit C with material reaches another stroke end position 3' (shown by broken line) so shutting the outlet of the hopper 2. The length of tube C is such as to permit the material to undergo the effect of the friction on the walls of conduit C, which, in combination with the internal friction of the material causes, by virtue of the axial force exerted by the pushing mechanism 3, the compression of the material along the conduit and therefore the formation of a zone of compact material D that prevents the passage of fluid or gas between the two zones. Such a passage is also prevented during the return of piston 3 in a direction opposite to arrow X after which occurs a new filling of conduit C by hopper 2 and a further pushing of the material toward zone B. The new material compresses itself against the previously compressed material and causes the latter to advance according to arrow X, until a quantity of the material discharges itself in the direction of arrow Y into zone B, dispersing in the process.

In the example of Fig. 2, the compression effect on the material due to the action of pusher 3' is secured not only by the friction in the conduit and the internal friction, but also by constriction 4 which is provided in conduit C. This constriction causes a compression of the material in part D upstream of the constriction. The widening of the conduit downstream of said constriction effects the expansion and therefore the breaking up of the material before it discharges into zone B.

In the example of Fig. 3, conduit C is a convergent-divergent member so as to effect a compacting in the constriction between zone D and zone E and dispersion before passing the compacted material into zone B.

In the construction shown in Fig. 4, the action on the material in contrast with the action of pushing medium 3' is obtained by an auxiliary mechanism having an opposing action. The auxiliary mechanism is constituted by a discoidal element 5 carried by a rod 6 co-axial with conduit C. Rod 6 can slide axially and is pressed by a helicoidal spring 7 in the direction of arrow Z, said spring bearing on one side upon the annular projection 8 of rod 6 and on the other upon cross piece 9 supported on diaphragm 1 by means of the two tie rods 10. By action on the nuts of the latter, the load on the spring can be varied. In the example illustrated, diaphragm 1 is cylindrical and represents therefore the planking of a reservoir in zone B. The rod 6 at its exit from said planking is provided with sealing members (not illustrated). Plate 5, in the absence of material, obstructs the exit of conduit C and, when the device is working, it hinders the progress of the material permitting it to be compressed in the conduit. Of course, when piston 3' has attained the compressing effect and effects a general advancement of the material in the conduit, plate 5 is displaced in a direction opposite to arrow Z permitting the discharge of the material into container B. The material coming out of conduit C crumbles against the front surface of discoidal element 9.

The construction shown in Fig. 5 is analogous to that of Fig. 4 excepting for the diverging form of the end of conduit C so that a crushing zone for the material previously compressed in cylindrical part D is effected.

In the construction of Fig. 6, conduit C is divergent with curvilinear generating lines and zones D and E for compressed material and disintegrating material are effected in an analogous way to what has been herebefore described.

In Fig. 6 is indicated by a broken line a cusp-like shape of the active front surface of plate 5 so as to better the conditions for the crushing of the compacted material and to create a regular flow of the latter in radial directions symmetrical with respect to the common axis of conduit C and of member 5.

Fig. 7 represents a particular form of the apparatus shown in Fig. 6. The divergent conduit C is formed by a series of cylindrical trunks of different diameters engaged one over the other and rigidly connected. The front surface of the mechanism 5, indicated by 5", is concave, which prevents the material from sticking to the surface itself.

Fig. 8 illustrates apparatus corresponding to the one shown in Fig. 1, with the exception that the mechanism for feeding the material is of the continuous type (in the illustrated example an Archimedean screw F rotating inside of the cylindrical conduit C).

Said screw may have a variable pitch decreasing in the direction of the feeding of the material (as illustrated in Fig. 9) so as to create a progressive compression of the material between the spirals of the screw.

The screw may also be arranged inside of a convergent conduit, it, too being conical and convergent so as to realize a progressive compression of the material in zone D. The material may then expand and disperse further on if a divergent portion of conduit C is provided. It is understood that the continuous feeding devices of Figs. 8, 9 and 10 may be combined with the constructional forms indicated in Figs. 2, 4, 5, 6 and 7.

In Fig. 11 is illustrated an alternate charging device (zone B having a greater pressure than zone A) actuated by a piston 12 sliding within a cylinder 13 by the action of a fluid under pressure (for instance, steam).

By varying the stroke and/or the frequency of the driving piston 12 it is possible to vary within certain limits the quantity of material transferred from one zone to the other per unit time. Conduit C terminates with a divergent portion and the input opening is closed by an automatic valve with an oscillating plate 14 fulcrumed at its upper part at 15 to diaphragm 1.

The valve tends to close by its own weight thus effecting a counter pressure analogous to the one obtained through the discoidal member 5 (Figs. 4, 5, 6 and 7).

The divergent portion of the conduit effects, on account of the greater pressure existing in zone B, a further compression of the material during the return stroke of pusher 3, improving the seal. In the construction of Fig. 12, the increase of resistance to the passage of the material along conduit C is obtained by an inclined diaphragm 16 constituting the last portion of the conduit inclined upwards.

What is claimed is:

1. Apparatus for the introduction of a finely divided solid material into a container under pressure, comprising a conduit leading to said container, means for introducing said material into said conduit, a pair of opposing pistons for compressing said material in said conduit, said conduit having a portion diverging toward said container which acts to disperse said material into said container upon the supply of additional material to said conduit and which forms a seat for the tapered plug of material which is formed under pressure so as to block positively the conduit.

2. Apparatus for the introduction of a finely divided solid material into a container under pressure comprising a conduit leading to said container, means for introducing said material into said conduit, a pair of opposing pistons for compressing said material in said conduit, one of said pistons having a cusp-like form, said conduit having a portion diverging toward said container which acts to disperse said compressed material into said container upon the supply of additional material to said conduit and which forms a seat for the tapered plug of material which is formed under pressure so as to block positively the conduit.

3. Apparatus for the introduction of a finely divided solid material into a container under pressure comprising a conduit leading to said container, means for introducing said material into said conduit, means for compressing said material in said conduit, said conduit being formed of a series cylindrical elements of increasing diameter to form a portion diverging outwardly in the direction of said container, said portion serving to disperse said compressed material into said container upon the supply of additional material to said conduit and to form a seat for the tapered plug of material which is formed under pressure so as to block positively the conduit.

4. Apparatus for the introduction of a finely divided solid material into a container under pressure comprising a conduit leading to said container, means for introducing said material into said conduit, a pair of opposing pistons for compressing said material in said conduit, said conduit having a portion diverging toward said container which acts to disperse said compressed material into said container upon the supply of additional material to said conduit, one of said pistons being concave and serving to crush the compressed material.

5. Apparatus for the introduction of a finely divided solid material into a container under pressure comprising a conduit leading to said container, means for introducing said material into said conduit, means for compressing said material in said conduit, said conduit having a portion diverging toward said container which acts to disperse said compressed material into said container upon the supply of additional material to said conduit and to form a seat for the tapered plug of material which is formed under pressure so as to block positively the conduit, and an upwardly turned portion to provide resistance to the movement of the material.

References Cited in the file of this patent

UNITED STATES PATENTS

| | | |
|---|---|---|
| 1,757,401 | Thomas | May 6, 1930 |
| 1,960,435 | Dudley | May 29, 1934 |
| 2,021,991 | Depew | Nov. 26, 1935 |
| 2,089,992 | Campbell et al. | Aug. 17, 1937 |
| 2,127,693 | McCanless et al. | Aug. 23, 1938 |
| 2,142,984 | Thurman | Jan. 3, 1939 |
| 2,428,995 | Rogers | Oct. 14, 1947 |
| 2,525,973 | Sundstrom et al. | Oct. 17, 1950 |

FOREIGN PATENTS

| | | |
|---|---|---|
| 262,901 | Great Britain | Dec. 23, 1926 |
| 360,943 | Great Britain | Nov. 9, 1931 |
| 498,883 | Belgium | Nov. 14, 1950 |